L. ACREE.
Cotton-Planter.
No. 27,091. Patented Feb. 14, 1860.
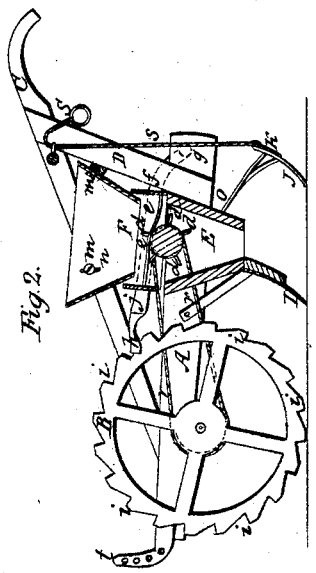
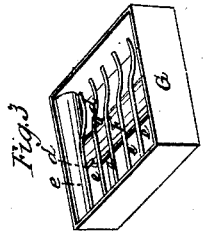
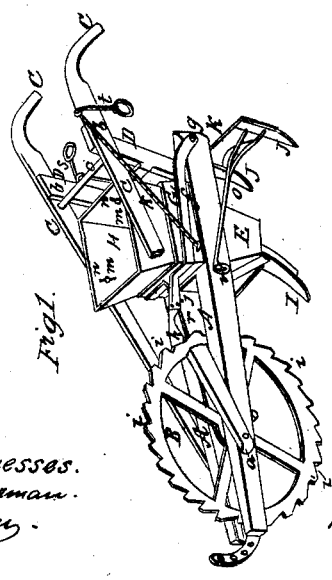
Witnesses.
Tho. W. Upperman.
E. Cohen.
Inventor.
L. Acree
per Atty A. B. Stoughton.

UNITED STATES PATENT OFFICE.

L. ACREE, OF TALIAFERRO COUNTY, GEORGIA.

IMPROVEMENT IN COTTON-SEED PLANTERS.

Specification forming part of Letters Patent No. 27,091, dated February 14, 1860.

*To all whom it may concern:*

Be it known that I, L. ACREE, of the county of Taliaferro and State of Georgia, have invented certain new and useful Improvements in Cotton-Seed Planters; and I do hereby declare the following to be a full, clear, and exact description of the construction and operation of the same, reference being had to the accompanying drawings, making a part of this specification, in which—

Figure 1 represents a perspective view of the planter. Fig. 2 is a longitudinal vertical section through the same; and Fig. 3 is a perspective view of the shaking box or hopper and the toothed feed-roll that works underneath it detached from the machine.

Similar letters of reference, where they occur in the separate figures, denote like parts of the machine in all the drawings.

Cotton-seed, from the amount of fiber adhering to them, must not only be forced down in the hopper by some positive means, but must also, by a similar forced or positive means, tear away from the bulk of the seed in the hopper the quantity that is to be planted. The object of my invention is to afford a cheap, simple, and effective means for accomplishing these two purposes; and the nature of my invention consists in interposing between the main hopper or seed-container and the toothed feed-roll a shaking-hopper that is agitated by the machine as it is drawn or pushed over the ground, and thus shake down and bring within reaching distance of the teeth on the feeding-roller the mass of cotton-seed overlying it.

To enable others skilled in the art to make and use my invention, I will proceed to describe its construction and operation.

A is a frame, supported at its forward end by a wheel, B.

C C are the handles, fastened to the frame at *a*, and, extending rearward and upward, are connected at *b* to the uprights D D, and further secured together by a rung, *c*.

To the frame is affixed a permanent director, E, through which the seed passes to the ground after it is drawn down from the main hopper above. At the top of this director E there is a cylinder, F, which has its journal-supports in the frame A. This cylinder F is furnished with teeth *d*, helically arranged around its perimeter, which project up into the box G through the slats *e* and draw down the cotton-seeds through said slats, and, carrying around by its continued revolution, allows it to drop through the director E into the furrow previously made to receive it, as will be explained. The box G is hinged by the arms *f* to the main frame at *g*, and its forward end is furnished with a projecting piece, *h*, which is struck by the teeth *i* on the wheel B, and causes a rapid agitation of the box G for the purpose of settling down the cotton-seed in it within reach of the teeth *d*. The vibration of the box G can be regulated, so as not to pack down or shake down the seed too fast, by raising the projecting piece *h* by means of the adjusting-holes *j*, and by drawing upon the cord *k*, which is connected by one of its ends to said box G, and the other end passing up into convenient position for the operator to seize, and thus raise up the front part of said box. It may be elevated entirely above the teeth *i*, and thus allow it to be stationary when the machine is being transported from field to field and is not planting.

Over the box G is the main hopper H. It is held to its place by means of set-screws *m*, passing through vertical slots *n*, but rests upon the box G underneath it. The object in thus connecting the hopper H by slots and set-screws is that, when the box G is raised or lowered to adjust its agitation, the hopper may rise and fall with it, but always together.

To the front part of the director E, or slightly in advance of it, there is a furrow-opener, I, which opens up the furrow for the seed to drop into, and to the rear of the frame is hinged by the arms *o* a coverer, J, for throwing the earth over the seed thus dropped into the furrow. An advancing motion of the machine over the field not only shakes down the seed to within reaching distance of the feeding-roller, but causes said feed-roller by its teeth to seize and draw through the slatted bottom of the box or hopper G the seeds in such measured or regulated quantities as may be desirable for uniform planting. An endless belt, *r*, passing around a pulley on the main wheel B and the feed-roller F, or a pulley thereon, rotates said feed-roller, and a cord or chain, *s*, fastened to the coverer J and extending upward in convenient proximity to the operator, allows said coverer to be raised up at any time and held, if desired.

*t* is a clevis or bow with several graduated holes in it, to which the team may be hitched to draw the machine.

In Fig. 4 I have shown the roller F detached, and showing how any number of rows of spirally-arranged teeth, $d$, may be set in it, $u\ u\ u$, &c., representing the holes for said teeth $d$. The coverers J are hinged to the main frame through the rods $o$, (one on each side,) and a peculiarly-shaped slotted hinge, $v$, which allows each coverer to adapt itself to the ground, while the main frame may be tipped over to one side or the other, and, if desirable, the coverers may be adjustable on the bar K, to which they are connected, said bar serving as a grading-bar.

Having thus fully described the nature and object of my invention, what I claim therein as new, and desire to secure by Letters Patent, is—

1. The combination of the hopper H, shaking-box G, and revolving feed-roller F, arranged, combined, and operating together in the manner and for the purpose herein stated.

2. Hinging the coverers to the main frame through the slotted hinges $v$, so that said coverers may follow the ground without being influenced by the frame, as set forth.

L. ACREE.

Witnesses:
JOSEPH D. HAMMACK,
NORMAN A. BELK.